United States Patent [19]

Macrander

[11] 4,064,449
[45] Dec. 20, 1977

[54] DIRECT CURRENT COMPENSATION CIRCUIT FOR TRANSFORMERS

[75] Inventor: Max S. Macrander, Warrenville, Ill.

[73] Assignee: GTE Automatic Electric Laboratories Incorporated, Northlake, Ill.

[21] Appl. No.: 714,437

[22] Filed: Aug. 13, 1976

[51] Int. Cl.² .................. G05F 1/56; H01F 19/02
[52] U.S. Cl. .................. 323/48; 179/18 FA; 323/6; 323/62; 325/493
[58] Field of Search .............. 323/44 R, 48, 61, 62, 323/9, 6; 325/493; 179/18 F, 18 FA, 170 J, 175.31 R

[56] References Cited

U.S. PATENT DOCUMENTS

| | | | |
|---|---|---|---|
| 3,317,817 | 5/1967 | Gershen | 323/9 |
| 3,714,548 | 1/1973 | Macrander | 323/48 |
| 3,781,571 | 12/1973 | Lord | 179/18 FA |
| 3,959,718 | 5/1976 | Hasegawa | 323/48 |

OTHER PUBLICATIONS

Instruments and Control Systems, Dec. 1972, p. 48.

Primary Examiner—Gerald Goldberg

[57] ABSTRACT

A direct current compensation circuit is provided for use with a transformer having a plurality of windings. A resistor is connected in series with a first winding. A transistor is coupled to the first resistor and to a compensation winding so that when the direct current flow through the resistor is greater than a predetermined value, a compensation current is supplied to the compensation winding. When the direct current flow through the resistor is less than the predetermined value, no compensation current is supplied to the compensation winding.

5 Claims, 1 Drawing Figure

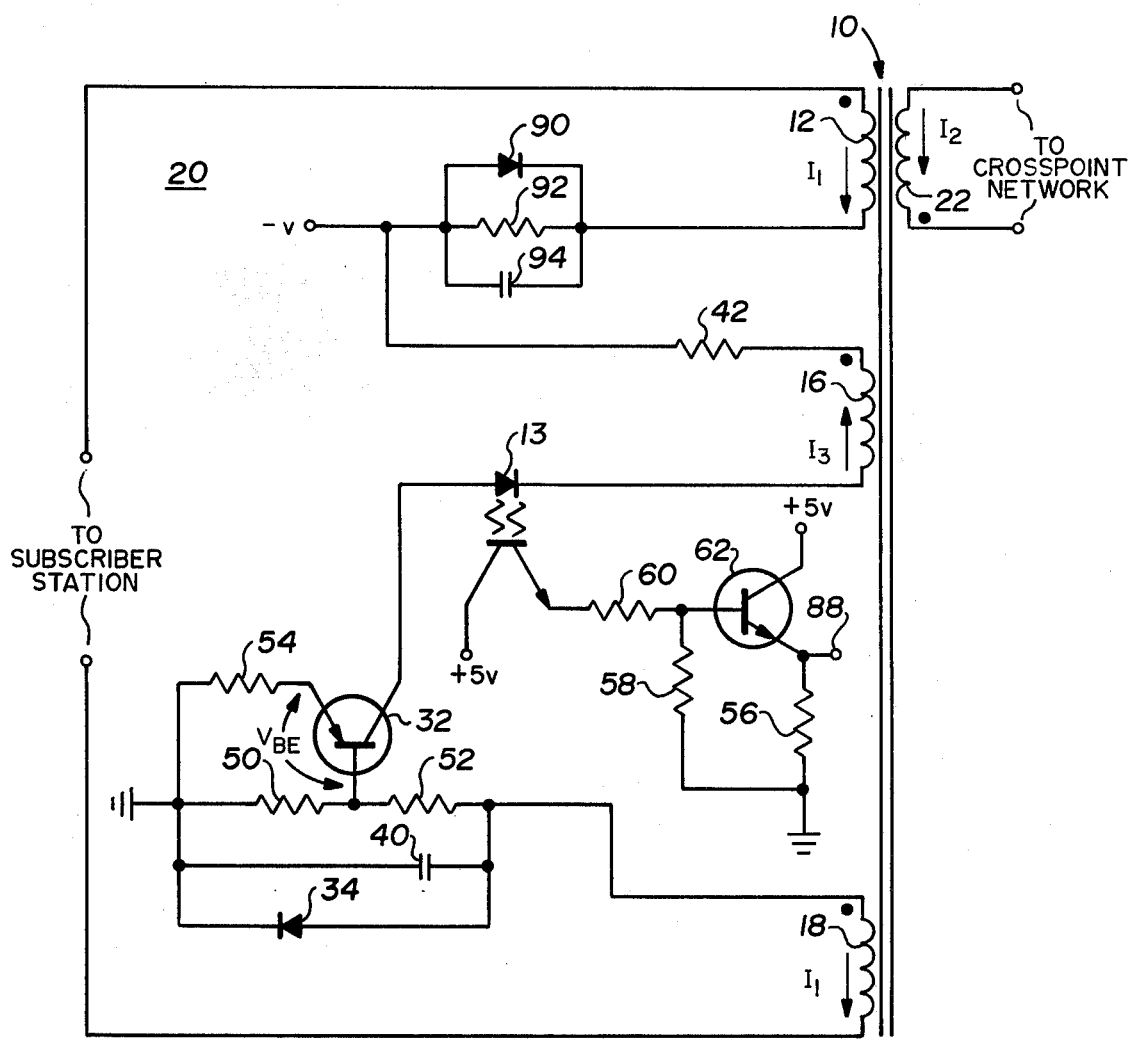

DIRECT CURRENT COMPENSATION CIRCUIT FOR TRANSFORMERS

BACKGROUND OF THE INVENTION

1. Field of Invention

This invention relates to a circuit for direct current compensation of miniature transformers.

2. Description of Prior Art

In my own U.S. Pat. No. 3,714,548, issued Jan. 30, 1973, a direct current compensation circuit for miniature transformers is described. The transformer to which that circuit is connected is typically employed to isolate telephone subscriber lines from telephone switching networks. That circuit is connected between a first winding of a transformer and a second or compensation winding of the transformer and is arranged so that any direct current flow through the first winding will result in a corresponding compensation current flow in the compensation winding.

One problem has been encountered in applying that circuit to transformers connected to an unbalanced crosspoint network. Specifically, in certain unbalanced crosspoint networks such as may be found in a PABX (private automatic branch exchange) a biasing direct current flows in the crosspoint transformer loop. The biasing direct current bias flows through the transformer winding connected to the crosspoint network which in turn produces a magnetic field in the transformer that is in the opposite magnetic direction of the magnetic field produced in the transformer by direct current flow in the windings connected in the subscriber loop. The net magnetic field in the transformer is thereby reduced and ideally, may be zero. However, although the crosspoint bias current is relatively constant, the subscriber loop current may vary. Thus, the magnetic field produced by the crosspoint winding may only partially compensate for the magnetic field produced by the subscriber loop windings.

SUMMARY OF THE INVENTION

The invention is an improvement of the circuit of the U.S. Pat. No. 3,714,548 referred to above.

In accordance with the invention a direct current compensation circuit for use with a transformer having a plurality of windings monitors the direct current flow through a first winding of the transformer. When the direct current flow through the first winding is greater than a predetermined value, the circuit generates a compensation current which is applied to a second winding of the transformer. When the direct current flow through the first winding is less than the predetermined value, no compensation current is generated. Further, in accordance with the invention, an output signal is generated to indicate whether the direct current flow in the first winding is greater or less than the predetermined value.

BRIEF DESCRIPTION OF THE DRAWING

The invention will now be described with reference to the accompanying drawing in which the single FIGURE shows a schematic representation of an embodiment of the invention.

DETAILED DESCRIPTION

With reference now to the figure, there is schematically shown in separation transformer 10 having windings 12 and 18 connected in a subscriber loop 20, compensation winding 16, and winding 22 in a crosspoint loop 26. A conventional power source, $-V$, is connected to the winding 12 via a standard feed impedance network comprising diode 90, resistor 92 and capacitor 94 and to the compensation winding 16 via a resistor 42. The power source, $-V$, may be a $-48$ volt central office battery commonly used in telephone systems. Resistors 50 and 52 are serially connected between ground potential and the winding 18. A transistor 32 has its base terminal connected to the node between resistors 50 and 52, its emitter coupled via resistor 54 to ground potential, and its collector coupled via photo emissive means or light emitting diode 13 to compensation winding 16. The light emitting diode 13 is coupled to a photo transistor 14 which is in turn connected to a transistor switch of a type well known in the art and comprising transistor 62 and biasing resistors 56, 58 and 60. A capacitor 40 and a diode 34 are connected in shunt across resistors 50 and 52. The resistor 52 in combination with the resistor 50 acts as a feed impedance for the subscriber loop. The capacitor 40 is selected so that alternating current signals will bypass the resistors 50 and 52 and the diode 34 provides reverse voltage protection to the compensation circuit.

Direct current signaling is employed in the subscriber loop to indicate whether the subscriber line is idle or busy, to indicate service requests and to transmit called number information in the form of dial pulses. With such signaling the subscriber loop is opened to indicate an idle condition, closed to indicate a busy condition or closed and opened in sequence to indicate dial pulses. Each time the loop is closed, a direct current $I_1$ flows in the windings 12 and 18. The windings 12 and 18 will produce a magnetic field in the transformer 10 in a first direction. Ideally, the current $I_1$ is of fixed magnitude. In practice, the current $I_1$ may vary.

The crosspoint network which is not shown requires a direct current bias. The bias current, $I_2$, flows through the winding 22 which is arranged so that the magnetic field it produces is opposite in direction to the field produced by windings 12 and 18. Thus, the magnetic field produced by winding 22 partially compensates for the magnetic field produced by the winding 12 and 18. For example, if windings 12 and 18 have a total number of turns $W_1$ and winding 22 has a number of turns $W_2$, then the net magnetic field (expressed in ampere-turns) produced in the transformer is $I_1 W_1 - I_2 W_2$. Since $W_1$ and $W_2$ are fixed and $I_2$ is a constant, the net magnetic field will be zero for only one value of $I_1$. With a compensation current $I_3$ flowing in winding 16 having $W_3$ turns, the net magnetic field will be zero if $$I_1 W_1 = I_2 W_2 + I_3 W_3 \tag{1}$$

or stated another way, the net magnetic field will be zero if $$I_3 = I_1(W_1/W_3) - I_2(W_2/W_3) \tag{2}$$

Since $W_1$, $W_2$, $W_3$ and $I_2$ constant, $I_3$ must vary in direct relationship with $I_1$ and $I_1$ is greater than $I_2(W_2/W_1)$ and must be zero otherwise.

In operation, the voltage produced across the resistor 50 may be determined from the following equation:

$$I_1 R_{50} = I_3 R_{54} + V_{BE} \tag{3}$$

where $R_{50}$ is the resistance value of resistor 50;

$R_{54}$ is the resistance value of resistor 54; and $V_{BE}$ is the base-emitter voltage of transistor 32 and where it is assumed that the emitter current is substantially equal to the collector current. The transistor 32 will be biased in the non-conduction state and current $I_3$ will be equal to zero as long as current $I_1$ is less than $V_{BE}/R_{54}$. When $I_1$ is greater than $V_{BE}/R_{54}$, the transistor 32 will be forward biased and will conduct a current $I_3$ such that $$I_3 = I_1(R_{50}/R_{54}) - (V_{BE}/R_{54}) \quad (4)$$

Comparing equation (4) with equation (2), the net magnetic field will be zero if $$(W_1/W_3) = (R_{50}/R_{54})$$

and $$I_2(W_2/W_3) = (V_{BE}/R_{54})$$

By way of illustrative example, in one embodiment of the invention the following circuit values were used:

$R_{50} = 30$ ohms
$R_{52} = 370$ ohms
$R_{54} = 20$ ohms
$V_{BE} = 0.42$ volts
$I_2 = 14$ milliamperes
Capacitor 40 = 40 micro farads When the current $I_3$ flows through the winding 16, the light emitting diode 13 is turned on. The light emitting diode 13 turns on photo transistor 14 which in turns causes the transistor 62 to produce an output signal. Thus, a signal is generated corresponding to the presence of signaling current $I_1$ in the subscriber loop.

Since certain changes in the above-described construction will occur to those skilled in the art without departure from the spirit of scope of the invention, it is intended that all matter contained in the preceeding description or shown in the appended drawing shall be interpreted as illustrative and not in a limitng sense.

What is claimed is:

1. A direct current compensation circuit for a transformer having a plurality of windings including a first winding connected in a first electrical loop having a bias current flowing therethrough, a second winding connected to a potential source in a second electrical loop and a compensation winding, said circuit comprising:

first resistance means including first and second serially connected resistors connected in series with said second electrical loop;

second resistance means connected to said potential source;

transistor means having first, second and third terminals, said first terminal connected between said first and second serially connected resistors and said second terminal connected to said second resistance means, said transistor means being in a first conductive state when the magnitude of direct current flowing through said first resistance means is less than a predetermined magnitude and in a second conductive state when the magnitude of direct current flowing through said first resistance means is greater than the predetermined magnitude;

first circuit means for connecting said third terminal to said compensation winding.

2. A circuit in accordance with claim 1 further comprising second circuit means for alternating current signals to bypass said first resistance means.

3. A circuit in accordance with claim 2 wherein said second circuit means includes a capacitor connected in shunt across said first resistance means.

4. A circuit in accordance with claim 3 wherein said circuit means comprises: photo-emissive means connected to said third terminal and said compensation winding, and photo responsive means coupled to said photo-emissive means.

5. A circuit in accordance with claim 3 wherein said transistor means comprises a transistor having its base connected to said first terminal, its emitter connected to said second terminal and its collector connected to said third terminal.

* * * * *